United States Patent
Van Duyne

(10) Patent No.: US 6,721,313 B1
(45) Date of Patent: Apr. 13, 2004

(54) SWITCH FABRIC ARCHITECTURE USING INTEGRATED SERDES TRANSCEIVERS

(75) Inventor: William F. Van Duyne, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 09/630,701

(22) Filed: Aug. 1, 2000

(51) Int. Cl.$^7$ .............................................. H04L 12/50
(52) U.S. Cl. ....................................... 370/386; 370/389
(58) Field of Search ............................. 370/389, 395.1, 370/400, 422–9, 386–8, 360, 362, 364, 365, 366; 710/1, 8, 104, 126, 129, 131, 132; 327/520; 326/26; 361/760, 761, 778, 779

(56) References Cited

U.S. PATENT DOCUMENTS

| | | |
|---|---|---|
| 5,309,432 A | 5/1994 | Kanakia |
| 5,521,903 A | 5/1996 | English et al. |
| 5,537,403 A | 7/1996 | Cloonan et al. |
| 5,557,610 A | 9/1996 | Calamvokis et al. |
| 5,583,861 A | 12/1996 | Holden |
| 5,724,352 A | 3/1998 | Cloonan et al. |
| 5,790,539 A | 8/1998 | Chao |
| 5,831,980 A | 11/1998 | Varma et al. |
| 5,870,538 A | 2/1999 | Manning et al. |
| 5,909,686 A | 6/1999 | Muller et al. |
| 6,009,092 A | 12/1999 | Basillico |
| 6,332,198 B1 * | 12/2001 | Simons et al. .................. 714/6 |
| 6,400,715 B1 * | 6/2002 | Beaudoin et al. ............ 370/392 |
| 6,404,752 B1 * | 6/2002 | Allen et al. .................. 370/335 |
| 6,460,120 B1 * | 10/2002 | Bass et al. ................... 711/148 |
| 6,614,796 B1 * | 9/2003 | Black et al. ................. 370/403 |
| 6,647,004 B2 * | 11/2003 | Allen et al. .................. 370/335 |
| 6,658,580 B1 * | 12/2003 | Bell et al. .................... 713/400 |

* cited by examiner

Primary Examiner—David Vincent
(74) Attorney, Agent, or Firm—Scully, Scott, Murphy & Presser; Richard A. Henkler, Esq.

(57) ABSTRACT

An integrated switch fabric architecture comprises: a plurality of high speed SERializer/DESerializer (SERDES) transceiver devices adapted for operation in an Inter-Cabinet, Cabled environment (SERDES ICC-type) and, a plurality of high speed SERDES transceiver devices adapted for operation in a High Speed Backplane (HSB) environment (SERDES HSB-type) that are maximally integrated on a single IC chip die to form a modular switch element for enabling communication among nodes of a network. The switch fabric architecture includes a crossbar switch device for communicating with a communications link associated with each ICC SERDES transceiver device and HSB SERDES transceiver device for enabling communication between the links inside the modular switch element. Depending upon the protocol implemented by the crossbar switch device, the modular switch element includes an ICC protocol translator device associated with each ICC SERDES communication link for enabling bi-directional communication with the crossbar switch device if operating in accordance with a crossbar switch protocol different than an ICC link protocol; and, additionally, an HSB protocol translator device associated with each HSB SERDES communication link for enabling bi-directional communication with the crossbar switch device if operating in accordance with a crossbar switch protocol different than an HSB link protocol.

16 Claims, 7 Drawing Sheets

SWITCH FABRIC ARCHITECTURE USING INTEGRATED SERDES TRANSCEIVERS

BACKGROUND OF THE INVENTION

1. Field of the Invention

This present invention relates generally to communications switch fabric architectures, and more particularly, to a novel switch fabric architecture that uses a modular switch element for providing the following advantages: maximum integration on a single die, more cost effective, allows for links to connect to industry standard interfaces, higher aggregate bandwidth, and greater connectivity with less switch fabric stages.

2. Discussion of the Prior Art

In the recent past, high speed SERializer/DESerializer, or SERDES, transceivers (i.e., data transfer rates greater than 1 Gbps) were implemented in ECL and GaAs because CMOS technology could not support these fast operating frequencies. During the last two years, CMOS technology has advanced so that high speed SERDES can be implemented in CMOS technology and integrated on a die that performs not only the SERDES functions, but also a lot of other functions. SERDES transceivers may be characterized as two fundamental types: 1) where data communication takes place in an Inter-Cabinet, Cabled environment (ICC); and, 2) for a High Speed Backplane (HSB) environment where data communication takes place intra-cabinet, over a printed circuit board or backplane. For the first ICC SERDES transceiver type, it is very desirable that it be compliant with industry standards (e.g., Fibre Channel and InfiniBand™). An example of an HSB SERDES is the IBM Microelectronics Division developed High Speed Serial Link (HSSL) SERDES core. Switch fabric developers have previously used one SERDES type to establish communication between the other devices in their switch fabric.

Because of the requirements of the two different SERDES types, ICC and HSB, there is a significant difference in the quantity of transceivers that may be integrated on a single die. Because the ICC SERDES type must communicate over relatively much longer distances and satisfy industry standard requirements, the maximum number of transceivers that may be integrated on a single die is typically four (4). Because the HSB SERDES type has relatively much less distance to travel, the SERDES design may be significantly optimized and, therefore, a much greater number of HSB transceivers may be integrated on a single die. Currently, it is possible to integrate anywhere from 4 to 96 HSB transceivers on a single die.

It would thus be highly desirable to provide a switch fabric architecture that integrates both ICC and HSB SERDES cores on a single die to provide communication between nodes at high speeds, e.g., greater than 500 Mbps, and which maximally achieves the benefits of both SERDES systems.

Current LAN switch architectures that enable communication between network nodes include U.S. Pat. No. 6,009,092 and U.S. Pat. No. 5,537,403. U.S. Pat. No. 6,009,092 describes a LAN switch architecture having port groups, or link types, that communicate via a switch fabric and are connected to PCs/Workstations, or nodes to enable communication at speeds of up to 155 Mbps (See Col. 1, lines 5–8). The system described in U.S. Pat. No. 6,009,092 makes use of a hybrid architecture with a switching fabric for "port group" to "port group" communication in addition to a "sub-fabric" for intra-port group communication with time division multiplexing for a port to access the switch fabric (Col. 1, lines 22–25). However, only ports are implemented to connect to nodes (Col. 4, lines 14–16) and does not teach or describe the use of unique link types implementing distinct protocols and protocol translation for communicating to the switch fabric. There is furthermore no mention of integrating unique port transceiver types on a single die.

U.S. Pat. No. 5,537,403 describes a telecommunications packet switching architecture that implements a crossbar switch to allow communications between "devices". However, the switch fabric itself is defined as a "single stage" network (Col. 5, lines 10–11) and as such, all ports connect to devices external to the switch fabric. Further, there is no mention of single die integration.

SUMMARY OF THE INVENTION

It is thus and object of the invention to provide a switch fabric architecture that integrates two different SERDES (ICC and HSB) transceiver type cores on a single die in order to exploit the best attributes of both SERDES transceiver types.

It is another object of the invention to provide a switch fabric architecture that integrates two different SERDES (ICC and HSB) transceiver type cores on a single die that not only allows for all of the integrated ICC SERDES links to be of the same industry standard compliance, but also allows the flexibility such that each integrated ICC SERDES link can satisfy unique protocol and interface requirements.

It is yet another object of the invention to provide a switch fabric architecture that integrates two different SERDES (ICC and HSB) transceiver type cores on a single die to function as a modular switch element for enabling the addition of switching stages to increase the number of nodes that can communicate with one another over the switch fabric.

It is a further object of the invention to provide a switch fabric architecture that integrates two different SERDES (ICC and HSB) transceiver type cores on a single die to enable communication between SERDES of the same type, via a crossbar switch and which provides protocol translations, when necessary, to enable communication between the two different SERDES types.

According to the invention, there is provided an integrated switch fabric architecture comprising: a plurality of high speed SERializer/DESerializer (SERDES) transceiver devices of a first type; and, a plurality of high speed SERDES transceiver devices of a second type, wherein the first type SERDES transceiver devices and second type SERDES transceiver devices are maximally integrated on a single IC chip die to form a modular switch element enabling communication among nodes of a network. The first type SERDES transceiver devices include SERDES devices enabling high speed data communication in an Inter-Cabinet Cabled (ICC) environment and the second type SERDES transceiver devices include SERDES devices enabling high speed data communication in a High Speed Backplane (HSB) environment. The Switch fabric architecture includes a crossbar switch device for communicating with a communications link associated with each said ICC SERDES transceiver device and HSB SERDES transceiver device for enabling communication between the links inside the modular switch element. Depending upon the protocol implemented by the crossbar switch device, the modular switch element includes an ICC protocol translator device associated with each ICC SERDES communication link for enabling bi-directional communication with the crossbar switch device if operating in accordance with a crossbar switch protocol different than an ICC link protocol; and, additionally, an HSB protocol translator device associated with each HSB SERDES communication link for enabling bi-directional communication with the crossbar switch device if operating in accordance with a crossbar switch protocol different than an HSB link protocol.

The switch fabric architecture implementing the modular switch element according to the invention provides the following advantages: maximum integration on a single die, is more cost effective, enables links to connect to industry standard interfaces, and, provides higher aggregate bandwidth, and greater connectivity with less switch fabric stages.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 1:
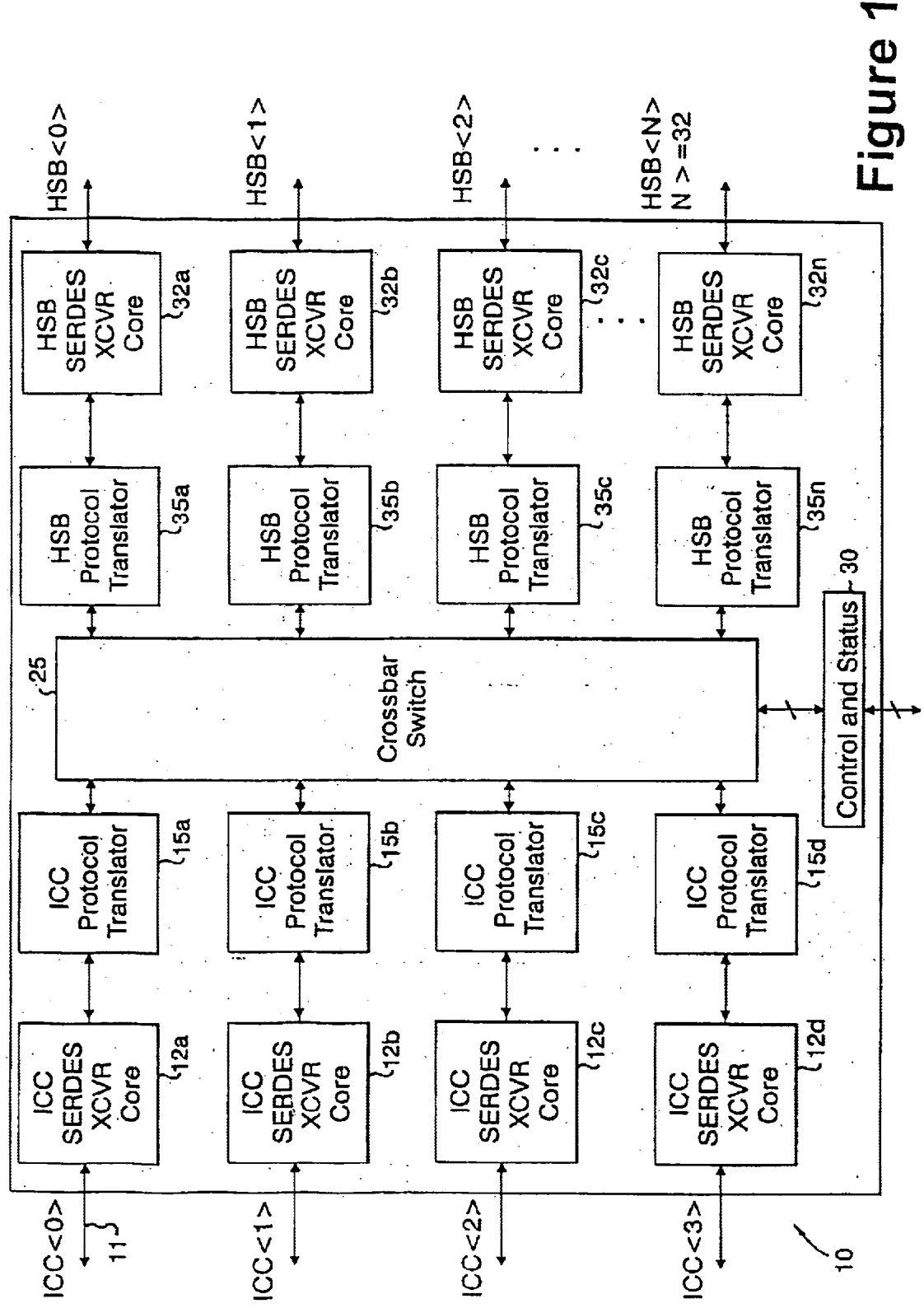
FIG. 1 is a high-level block diagram representation illustrating the integration of two SERDES transceiver type cores on a single die.

FIG. 1 is a high-level block diagram representation of switch fabric architecture 10 integrating the two SERDES transceiver types on a single die. In the diagram of FIG. 1, the switch fabric architecture 10 acts as the modular switch element in building a switch fabric that would allow "nodes" to communicate with one another, with a node being a device that performs some type of function, including, but not limited to, a computer processing subsystem or a disk array subsystem, etc.

As shown in FIG. 1, the switch fabric architecture 10 comprises the following key sub-blocks of the modular switch device: an array of ICC SERDES Transceiver (XCVR) Cores 12a, . . . 12d, a corresponding array of ICC Protocol Translators 15a, . . . , 15d with each ICC Protocol translator connected with a corresponding ICC transceiver core, an array of HSB SERDES XCVR Cores 32a, 32d, . . . 32n, a corresponding array of HSB Protocol Translators 35a, 35d, . . . , 35n, with each HSB Protocol translator connected with a corresponding ICC transceiver core, a Crossbar Switch 25 interfaced with each ICC Protocol translator and HSB Protocol Translator device, and, a Control and Status block 30.

With greater specificity, as shown in FIG. 1, each ICC SERDES XCVR Core receives a corresponding ICC link external to the chip 10 which are differential, single bit wide data links. All intra-chip communication links however, utilize parallel data buses. Therefore, each ICC SERDES XCVR Core includes the necessary functionality to convert differential, single bit wide data entering the device into parallel data that will interface with the internal logic of the chip. Also, each ICC SERDES XCVR Core includes functionality for converting the internal parallel data to differential, single bit wide data that is transmitted from the chip 10 via the external ICC link. It is understood that the quantity of transceiver cores that may be integrated on a single die is limited by the available CMOS technology. As shown in FIG. 1, only four (4) ICC type transceivers may be integrated on a single die however, it is conceivable that as CMOS technology improves, eight (8) or more ICC type transceiver cores may be present on a single die. For purposes of discussion therefore, it is assumed that four (4) ICC SERDES XCVR Core types are present on a single die, but this architecture is not intended to be limited to just that quantity. It is further understood that all four (4) of the ICC SERDES XCVR cores may be of the same industry standard compliance, however, this switch fabric architecture is flexible so that each ICC SERDES XCVR Core may satisfy unique protocol and interface requirements. For example, two of the four ICC links could be Fibre Channel compliant SERDES XCVR cores and interfaces, one of the four ICC links may be an Infiniband compliant SERDES core and interface, and one of the four ICC links could be a Gigabit Ethernet compliant core and interface.

With greater specificity, each HSB SERDES XCVR Core receives a corresponding HSB link external to the chip 10 which are differential, single bit wide data. As mentioned above, all intra-chip communication links however, utilize parallel data buses. Thus, each HSB SERDES XCVR Core includes the necessary functionality to convert differential, single bit wide data entering the chip into parallel data that will interface with the internal logic of the chip. Additionally, each HSB SERDES XCVR Core includes functionality for converting the internal parallel data to differential, single bit wide data that is transmitted from the chip 10 via the external HSB link. The quantity of HSB transceiver cores that may be integrated on a single die is limited by the available CMOS technology. Currently, 4 to 96 HSB type transceivers may be integrated on a single die. As compared to previous and current switch architectures, the architecture depicted in FIG. 1 that utilizes both SERDES types on a single die is very attractive when 16 or more HSB SERDES transceivers are integrated on a single die, and the value becomes very attractive for 32 or more HSB transceivers on a single die. Thus, for purposes of discussion, it is assumed that 32 HSB SERDES transceivers are integrated on a single die in conjunction with the 4 ICC transceivers. As with the quantity of ICC SERDES XCVR Cores, this architecture is not intended to be limited to just one quantity of HSB links integrated on a single die.

As shown in FIG. 1, each of the ICC and HSB links must be able to communicate with one another inside the modular switch element. The Crossbar Switch 25 is the mechanism by which monocast, multicast, and broadcast communication may occur. Therefore, any ICC or HSB link may initiate communication with one specific ICC or HSB link, or a collection of ICC and HSB links. Thus, for example, assuming an architecture comprising 4 ICC links and 32 HSB links, then any one of the 4 ICC links may establish communication with any one of the other 3 ICC links or any of the 32 HSB links, or a combination of the 3 ICC links/32 HSB links. For example, a monocast operation may consist of link ICC<2> establishing communication with link HSB<18>. A multicast operation may consist of HSB<14> communicating with HSB<7>, HSB<15> and HSB<26>. A broadcast operation could consist of ICC<1> communicating with ICC<3:2,0> and HSB<31:0>. The protocol that is used by the Crossbar Switch 25 may comprise: an ICC protocol, the HSB protocol, or a unique protocol however, the protocol is not critical to the definition of this switch fabric architecture.

It is understood that whenever the ICC link protocol differs from the Crossbar Switch protocol, protocol translation is necessary to allow bi-directional communication between the ICC links via the Crossbar Switch. Three different Crossbar Switch protocol options include:

1. If an ICC protocol where chosen for the Crossbar Switch and all ICC interfaces use the same ICC as the Crossbar Switch, then the ICC Protocol Translator blocks are unnecessary and the ICC SERDES XCVR Core blocks 12a, ..., 12d may be connected directly to the Crossbar Switch block 25. If an ICC protocol were selected for the Crossbar Switch and a variety of ICC SERDES interfaces are integrated on the same die, then only those links that have a different protocol from the ICC protocol chosen for the Crossbar Switch would require a corresponding ICC Protocol Translator block 15a, ..., 15d to perform the translations between the different protocols.
2. If the HSB protocol were selected for the Crossbar Switch, then the ICC Protocol Translator blocks would perform the necessary translations between the different protocols.
3. If a unique protocol were selected for the Crossbar Switch, then the ICC Protocol Translator blocks would perform the necessary translations between the different protocols.

Likewise, whenever the HSB link protocol differs from the Crossbar Switch protocol, protocol translation is necessary to allow bi-directional communication between the HSB links via the Crossbar Switch. The three different Crossbar Switch protocol options include:

1. If an ICC protocol were selected for the Crossbar Switch, then the HSB Protocol Translator blocks 35a, ..., 35n would perform the necessary translations between the different protocols.
2. If the HSB protocol were selected for Crossbar Switch, then the HSB Translator blocks are unnecessary and the HSB SERDES XCVR Core blocks 32a, ..., 32n may be connected directly to the Crossbar Switch 25.
3. If a unique protocol were selected for the Crossbar Switch, then the HSB Protocol Translator blocks would perform the necessary translations between the different protocols.

As known, a Crossbar Switch typically requires configurability, controllability, diagnosability, and observability. The Control and Status block 25 serves to address these requirements. An interface that is external to the Modular Switch Element may provide a convenient access to the Control and Status block functions. Some of the "control" type functions may include crossbar switch initialization, arbitration, determining proper destination link routing, flow control, diagnostics, troubleshooting, and fault isolation. Some of the "status" type functions may include monitoring network activity, error reporting, diagnostic results reporting, and maintenance reporting.

Figure 2:
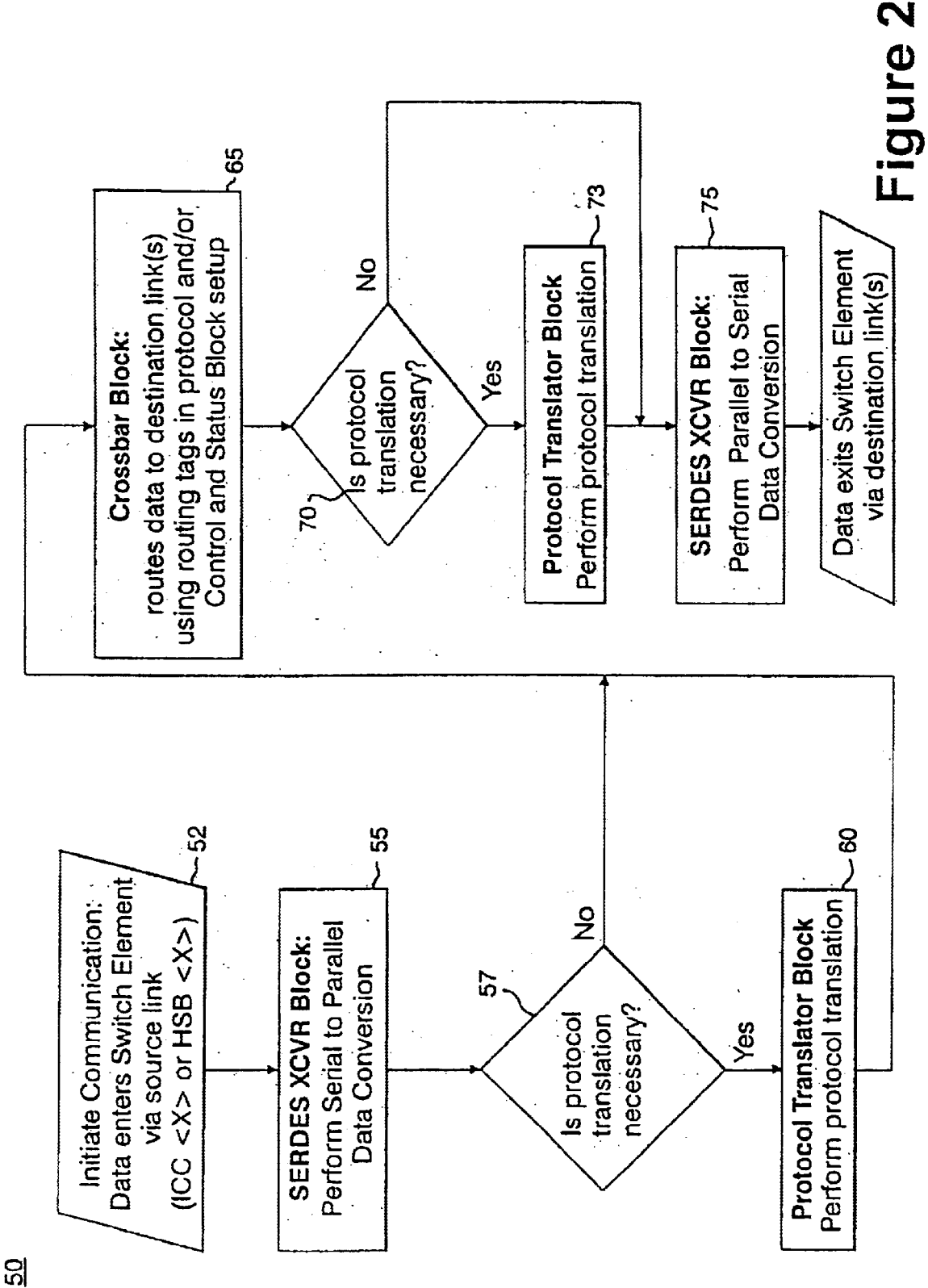
FIG. 2 illustrates a flowchart representation of a source link communicating with a destination link(s) in the Modular Switch Element.

FIG. 2 illustrates a flowchart representation of a source link Communicating with a destination link(s) in the Modular Switch Element 10. As indicated at step 52, any link (ICC<X> or HSB<X>) may initiate communication with the Modular Switch Element 10 by receiving data from some external source. Furthermore, any number of source links may initiate communication with the Modular Switch Element simultaneously. Incoming data will be converted from serial to parallel via the SERDES XCVR Block (ICC links use the ICC SERDES XCVR Core Block and HSB links use the HSB SERDES XCVR Core Block) as indicated at step 55. At step 57, a determination is made as to whether protocol translation is necessary. That is, as mentioned above, once the data has been converted from serial to parallel, protocol translation may be necessary based on whether the incoming protocol is different from Crossbar protocol. If at step 57, it is determined that protocol translations are not necessary, then the parallel data that is output from the SERDES XCVR Block may connect directly to the Crossbar Block at step 65; otherwise, as indicated at step 60, the Protocol Translator Block will perform the necessary translations so that data flow may continue into the Crossbar Block. At step 65, the Crossbar Block may take the incoming parallel data and route it to one or more destination link interfaces based on routing tags contained in the source data stream. The Control and Status block may assist in the data routing. At step 70, a determination is made as to whether the data exiting the Crossbar Block has the same protocol as the destination link external to the Modular Switch Element. If the protocol at the destination link is the same, then no protocol translation is necessary and the Crossbar Block is connected directly to the SERDES XCVR Block as indicated at step 75; otherwise, if the data exiting the Crossbar Block has a different protocol than the destination link external to the Modular Switch Element, then protocol translation is performed via the Protocol Translator Block at step 73, prior to forwarding to the SERDES XCVR Block. At step 75, the SERDES XCVR block converts the parallel data to serial data (ICC links use the ICC SERDES XCVR Core Block and HSB links use the HSB SERDES XCVR Core Block) so that it may exit the Modular Switch Element and continue on to its intended destination as indicated at step 80.

Because of the relatively large number of HSB links in the modular switch chip 10, the primary role of the HSB links is to enable switch fabric connectivity in a very dense fashion. The number of switch stages in some crossbar switch fabrics is governed by the following equation:

$$\text{number\_of\_links}^{(\text{number\_of\_switch\_stages})} = \text{number\_of\_node\_connections}$$

For the assumption of a 32 HSB link switch element, only one switch element stage would be required to support 32 nodes. If one were to use a 4 ICC link switch element, then three switch element stages would be necessary. Theoretically, a two switch stage fabric that uses the 32 HSB link crossbar switch elements could support 1024 nodes. A four (4) ICC link crossbar would require five switch stages in order to support 1024 nodes. It is much better to have the lowest possible number of switch stages, because the latency through the switch fabric and number of required chips may be significantly reduced. Therefore, the HSB links are clearly superior for building up the switch fabric. Due to the quantity limitation of the ICC links on a single die, as well as the industry standard capabilities, the primary role of ICC links is to connect to nodes that have an ICC compliant interface. As a secondary role, the ICC links may be used to build up the switch fabric, however, because of the limited number of node interface links, this secondary role would rarely be used.

Figure 3:
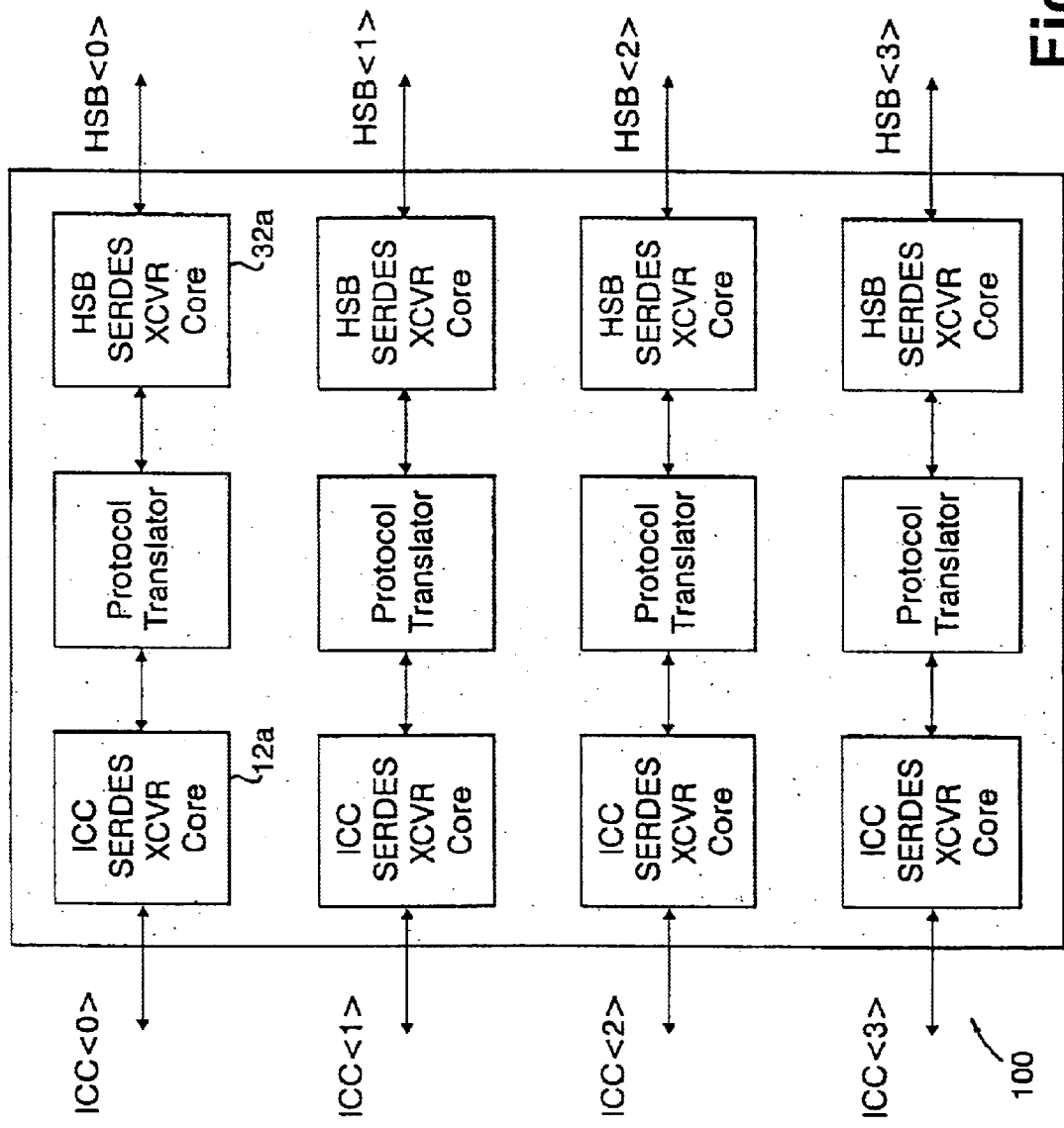
FIG. 3 shows a block diagram representation of a transceiver switch device implementing protocol translation between ICC and HSB SERDES types.

A secondary role for the HSB links would be to connect these links to nodes. In order to accomplish this connection, another device may be created that performs ICC to HSB protocol translation as well as HSB to ICC protocol translation. FIG. 3 shows a block diagram representation of such a transceiver switch device 100. As shown in FIG. 3, assuming four (4) ICC links on a single die, four (4) HSB links on this transceiver chip 100 could be connected to four (4) of the HSB links on the modular switch element.

There are many different switch fabric architectures that make use of a SERDES and parallel links to build up the switch fabric and connect to nodes. The switch fabric modular element intra-stage connections and the connections to nodes were of the same type (SERDES or parallel). With a parallel link switch element, the I/O count of the device becomes unwieldy for a large link count crossbar switch element due to chip, printed circuit board, backplane and cabling issues. Therefore, a SERDES solution makes the most sense for a crossbar switch element. Current switch architecture development is directed to integrating only one SERDES type with the crossbar switch logic on a single die.

There are a variety of switch fabric implementations where the SERDES types integrated on a single die may apply. For comparison purposes, a Folded Banyan Switch Fabric topology will be used to illustrate the benefits of the following configurations: 1) where only an ICC type of integrated SERDES is used for the switch fabric modular element; 2) where an HSB type of integrated SERDES is used for the switch fabric modular element; and 3) where both the ICC and HSB types of integrated SERDES are used for the switch fabric modular element.

As known, the number of links that may be supported by a switch element in a Folded Banyan Switch Fabric is represented as a×b with "a" denoting the number of input ports and "b" denoting the number of output ports. One "a" input and one "b" output comprises a complete link or transceiver. For example, a 4×4 switch element means that there are four transceivers, or links, in this switch element, 4 inputs and 4 outputs. The a×b switch element is connected in stages to allow more nodes to be connected to the switch fabric. A folded Banyan Switch Fabric is governed by the following equation:

$$\text{number\_of\_links}^{(number\_of\_switch\_stages)} = \text{number\_of\_node\_connections}$$

Figure 4:
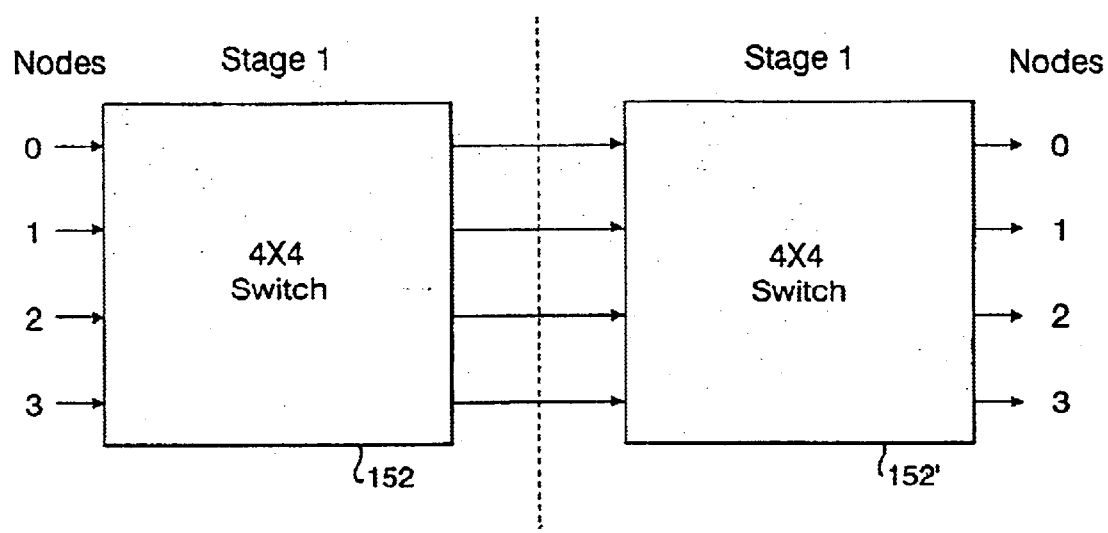
FIG. 4 depicts a Folded Banyan Switch Fabric architecture 150 with an ICC type SERDES is integrated on a single die resulting in a one stage network for supporting a maximum of 4 nodes.
Figure 5:
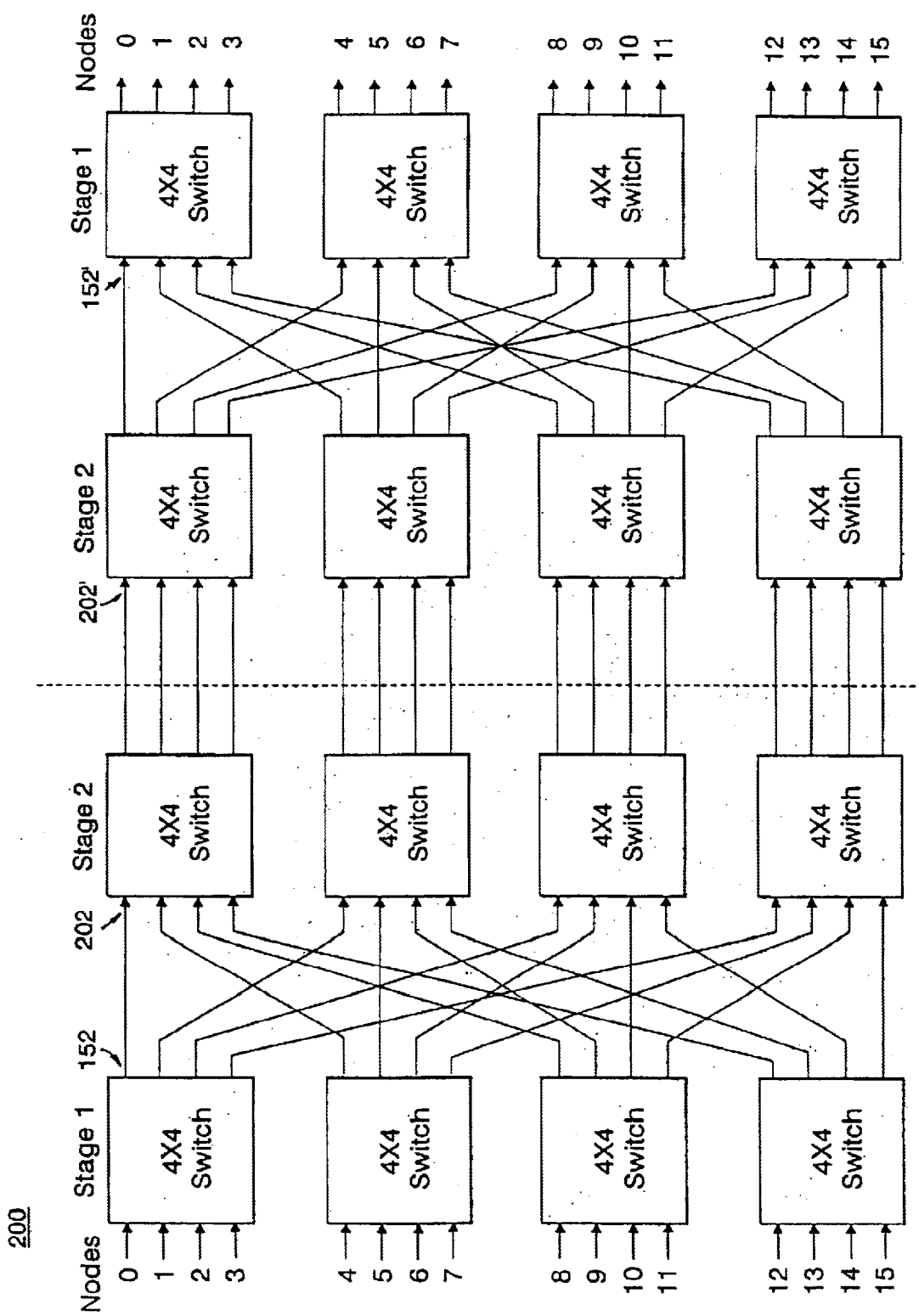
FIG. 5 illustrates a Folded Banyan Switch Fabric architecture 200 that supports 16 nodes with a two stage network comprising integrated ICC type SERDES.

For a Folded Banyan Switch Fabric architecture where only an ICC type SERDES is integrated on a single die, a 4×4 switch element is possible. FIG. 4 illustrates a Folded Banyan Switch Fabric architecture 150 where only ICC type SERDES is integrated on a single die. As shown in FIG. 4, a one stage network can support a maximum of 4 nodes. The nodes 0,1,2,3 designators on the respective left half 152 and right half 152' of the one switch stage represent the inputs and outputs to the 4 nodes. For example, the left Node 2 designator represents the node 2 output (switch fabric input) of the ICC link from Node 2 and the right Node 2 designator represents the node 2 input (switch fabric output). In order to support more than 4 nodes, more switch element stages must be added. FIG. 5 illustrates that 16 nodes may be supported with a two stage network 200 comprising respective left half 152 and right half 152' first stages and respective left half 202 and right half 202' second stages. The number of 4×4 Switch Elements has thus increased significantly, to 16. In order to support a very large number of nodes, for example 1024, a five stage network would be required with a total of 2560 4×4 Switch Elements (not shown). Thus, it is understood that although the ICC type link is desirable because of its capabilities for industry standard compliance of communication over relatively longer distances, the quantity of switch elements becomes very large for large systems of nodes.

Figure 6:
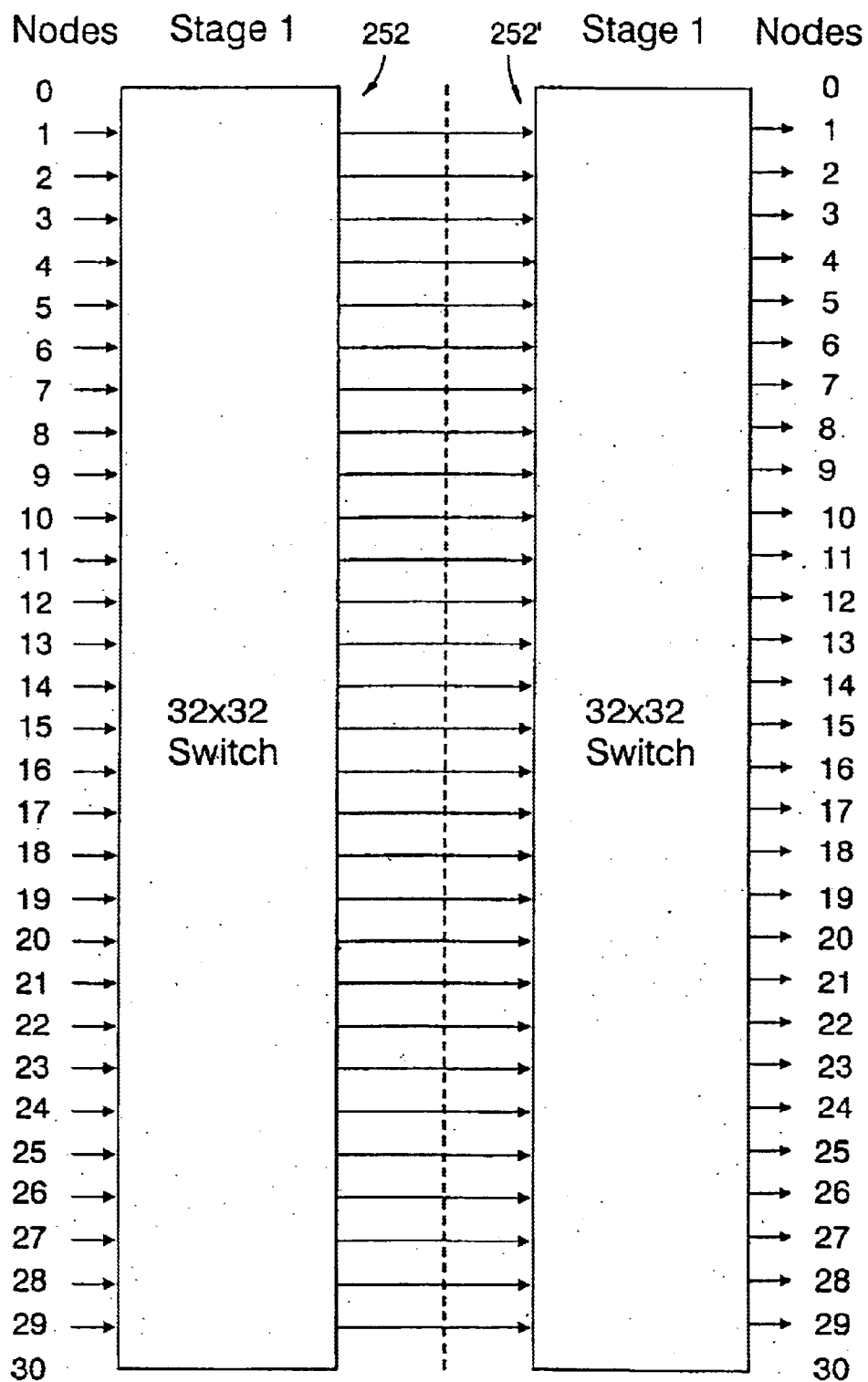
FIG. 6 illustrates a Folded Banyan Switch Fabric architecture 250 that supports 32 nodes with a one stage network implementing two HSB type SERDES 32×32 Switch Elements.

For a Folded Banyan Switch Fabric where only an HSB type SERDES is integrated on a single die, a 32×32 switch element is possible. FIG. 6 illustrates a one stage network 250 that uses only two 32×32 Switch Elements 252, 252', such that 32 nodes may be supported. In order to support a very large number of nodes, for example 1024, a two stage network would be required with a total of 128 32×32 Switch Elements. The reason this network is unfeasible is because the HSB links are limited to an intracabinet environment. In order to support 1024 nodes, a SERDES link would have to be capable of inter-cabinet, cabled communication.

Figure 7:
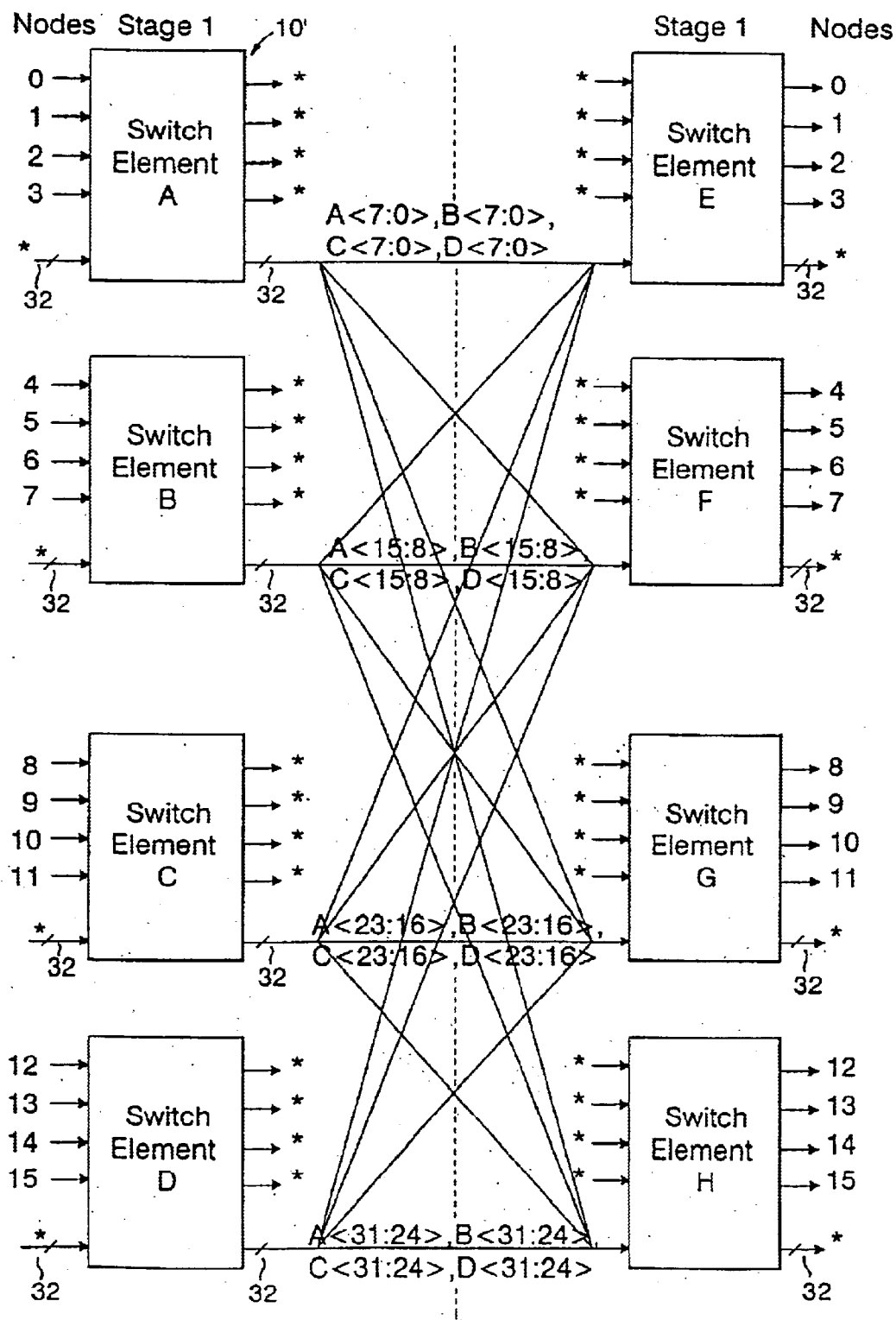
FIG. 7 illustrates a Folded Banyan Switch Fabric architecture 300 that supports 16 nodes with a one stage network utilizing only eight (8) "4×4+32×32" Switch Elements as depicted in FIG. 1.

For a Folded Banyan Switch Fabric where both the ICC type and HSB type SERDES are integrated on a single die, a "4×4 ICC"+"32×32 HSB" Switch Element is possible. The 4×4 (ICC)+N×N(HSB) as described above with respect to FIG. 1 illustrates this switch element 10' with N=32. Each ICC link 11 may communicate with the other ICC links as well as all of the HSB links. Likewise, each HSB link may communicate with the other HSB links as well as all of the ICC links. The HSB links efficiently establish the connectivity of the switch fabric and the ICC links communicate with the nodes. FIG. 7 illustrates a Folded Banyan Switch Fabric architecture 300 that supports 16 nodes with a one stage network 302, 302' implementing only eight (8) "4×4+32×32" Switch Elements 10'. It readily follows that a 32 node system may also be achieved with only one network stage and 16 "4×4+32×32" Switch Elements. In order to support a very large number of nodes, for example 1024 nodes, a two stage network would be required with a total of 1024 "4×4+32×32" Switch Elements. As shown in FIG. 7, the Switch Element interfaces marked with an "*" are unused. If the ICC <–> HSB Transceiver Chip 100 described above with respect to FIG. 3 is introduced, then a 32 node system may be supported within one stage with eight (8) "4×4+32×32" Switch Elements 10' and four (4) ICC <–> HSB Transceiver chips 100. A 1024 node system can be achieved in two stages with 128 "4×4+32×32" Switch Elements 10' and 224 ICC <–> HSB Transceiver Chips 100. The "4×4+32×32" Switch Element 10' may also function as a 36×36 Switch Element.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

I claim:

1. An integrated switch fabric architecture comprising:
    a plurality of high speed SERializer/DESerializer (SERDES) transceiver devices of a first type;
    a plurality of high speed SERDES transceiver devices of a second type, said first type SERDES transceiver devices and second type SERDES transceiver devices being maximally integrated on a single IC chip die to form a modular switch element enabling communication among nodes of a network.

2. The integrated switch fabric architecture as claimed in claim 1, wherein said first type SERDES transceiver devices include SERDES devices enabling high speed data communication in an Inter-Cabinet Cabled (ICC) environment.

3. The integrated switch fabric architecture as claimed in claim 2, wherein said second type SERDES transceiver devices include SERDES devices enabling high speed data communication in a High Speed Backplane (HSB) environment.

4. The integrated switch fabric architecture as claimed in claim 3, wherein each said ICC SERDES transceiver devices and HSB SERDES transceiver devices include communication links, said integrated switch fabric architecture further comprising:

a crossbar switch device enabling each said ICC SERDES communication links and HSB SERDES communication links to communicate inside said modular switch element.

5. The integrated switch fabric architecture as claimed in claim 4, wherein said crossbar switch device enables one of: monocast, broadcast and multicast communication between said ICC SERDES communication links and HSB SERDES communication links.

6. The integrated switch fabric architecture as claimed in claim 5, wherein said crossbar switch device operates in accordance with a crossbar switch protocol, said integrated switch fabric architecture further comprising:

an ICC protocol translator device associated with each ICC SERDES communication link for enabling bi-directional communication with said crossbar switch device if operating in accordance with a crossbar switch protocol different than an ICC link protocol;

an HSB protocol translator device associated with each HSB SERDES communication link for enabling bi-directional communication with said crossbar switch device if operating in accordance with a crossbar switch protocol different than an HSB link protocol.

7. The integrated switch fabric architecture as claimed in claim 5, further comprising control device for enabling configuration of said crossbar switch device.

8. The integrated switch fabric architecture as claimed in claim 5, defining a Folded Banyan Switch element having M×M ICC SERDES transceiver devices and N×N HSB SERDES transceiver devices on a single die with M>=1, N>=1.

9. The integrated switch fabric architecture as claimed in claim 5, defining a translator element comprising N×N ICC SERDES transceiver devices and N×N HSB SERDES transceiver devices on a single die, with N>=1 providing up to N ICC links and N HSB links for connecting nodes, and comprising N protocol conversion devices for providing ICC to HSB protocol translation in addition to HSB to ICC protocol translation.

10. A method for communicating between links in an integrated switch fabric enabling communication among nodes of a network, said integrated switch fabric comprising a plurality of high speed SERializer/DESerializer (SERDES) transceiver devices maximally integrated on a single IC chip die to form a modular switch element and including a crossbar switch device for routing data from source communication links to destination communication links, said method comprising:

a) receiving a data communication on a single source link associated with a first SERDES transceiver device;

b) routing said converted data to said crossbar switch device; and, c) forwarding said data to a destination link associated with a second SERDES transceiver device.

11. The method as claimed in claim 10, wherein said step a) further includes the step of performing serial to parallel data conversion of said received data at said first SERDES transceiver device.

12. The method as claimed in claim 10, wherein prior to said routing step b), the step of:

determining a need for protocol translation to enable communication of said converted data to said crossbar switch for routing said data to a destination link; and, in response to said determination, performing protocol translation prior to routing converted data to said crossbar switch if said conversion is necessary.

13. The method as claimed in claim 10, wherein prior to said forwarding step c), the step of:

determining a need for protocol translation to enable communication of said data to said destination link for output thereof; and, in response to said determination, performing protocol translation prior to routing said converted data to said destination link, if necessary.

14. The method as claimed in claim 13, wherein said step c) further includes the step of performing parallel to serial data conversion of said converted data at said second SERDES transceiver device.

15. The method as claimed in claim 13, wherein said first SERDES transceiver device includes an ICC type SERDES transceiver core and, said second SERDES transceiver device includes an HSB type SERDES transceiver core.

16. A modular Folded Banyan Switch element for enabling communication among nodes of a network, said switch element comprising: M×M ICC SERDES transceiver devices and N×N HSB SERDES transceiver devices maximally integrated on a single IC chip die with M>=1, N>=1; and, a crossbar switch device communicating with a communications link associated with each said ICC SERDES transceiver device and HSB SERDES transceiver device for enabling communication between said links inside said modular switch element.

* * * * *